US010438137B2

(12) United States Patent
Ratti et al.

(10) Patent No.: US 10,438,137 B2
(45) Date of Patent: Oct. 8, 2019

(54) SYSTEM FOR REAL-TIME OPTIMAL MATCHING OF RIDE SHARING REQUESTS

(71) Applicant: Massachusetts Institute of Technology, Cambridge, MA (US)

(72) Inventors: Carlo Filippo Ratti, Cambridge, MA (US); Paolo Santi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 303 days.

(21) Appl. No.: 14/507,299

(22) Filed: Oct. 6, 2014

(65) Prior Publication Data

US 2016/0098650 A1 Apr. 7, 2016

(51) Int. Cl.
*G06Q 10/02* (2012.01)
*G06Q 10/06* (2012.01)

(52) U.S. Cl.
CPC ..... *G06Q 10/02* (2013.01); *G06Q 10/063114* (2013.01); *G06Q 10/063118* (2013.01)

(58) Field of Classification Search
CPC ............................... G06Q 10/02; G06Q 10/06
USPC ............................................................ 705/5
See application file for complete search history.

(56) References Cited

U.S. PATENT DOCUMENTS

2012/0232943 A1 9/2012 Myr
2013/0096827 A1* 4/2013 McCall ................ G06Q 10/047 701/533
2014/0188775 A1* 7/2014 Lehmann ........... G01C 21/3438 706/46
2015/0161554 A1 6/2015 Sweeney et al.
2015/0339928 A1 11/2015 Ramanujam
2016/0247106 A1 8/2016 Dalloro et al.
2016/0292596 A1* 10/2016 Gaitan ................. G06Q 10/025
2018/0204158 A1 7/2018 Ratti et al.

OTHER PUBLICATIONS

Optimizing ride matches for dynamic ride-sharing systems, by Xing Yang, published by Georgia Institute of Technology in 2013. (Year: 2013).*
International Search Report and Written Opinion dated Apr. 23, 2018 in connection with International Application No. PCT/US2018/014333.
[No Author Listed], New York Taxi and Limousine Commission. 2014 Taxicab Fact Book. New York City. 2014; 13 pages.
Sagarra et al., Supersampling and Network Reconstruction of Urban Mobility. PLOS One, San Francisco, CA. Aug. 2015; 15 pages.
P. Santi et al., Quantifying the benefits of vehicle pooling with shareability networks. PNAS. Sep. 16, 2014; 111(37):13290-13294.

* cited by examiner

*Primary Examiner* — Brian M Epstein
*Assistant Examiner* — Zeina Elchanti
(74) *Attorney, Agent, or Firm* — Wolf, Greenfield & Sacks, P.C.

(57) ABSTRACT

System for optimal matching of ride sharing requests. A trip request manager receives trip requests from patrons and a shareability network is established. The system checks to see whether certain parameters related to ride-sharing delays are less than or equal to other parameters to decide whether trips are shareable.

19 Claims, 1 Drawing Sheet

10
12
TSS
TRM
14
TMM
VDS
18
16
TTES
20
22

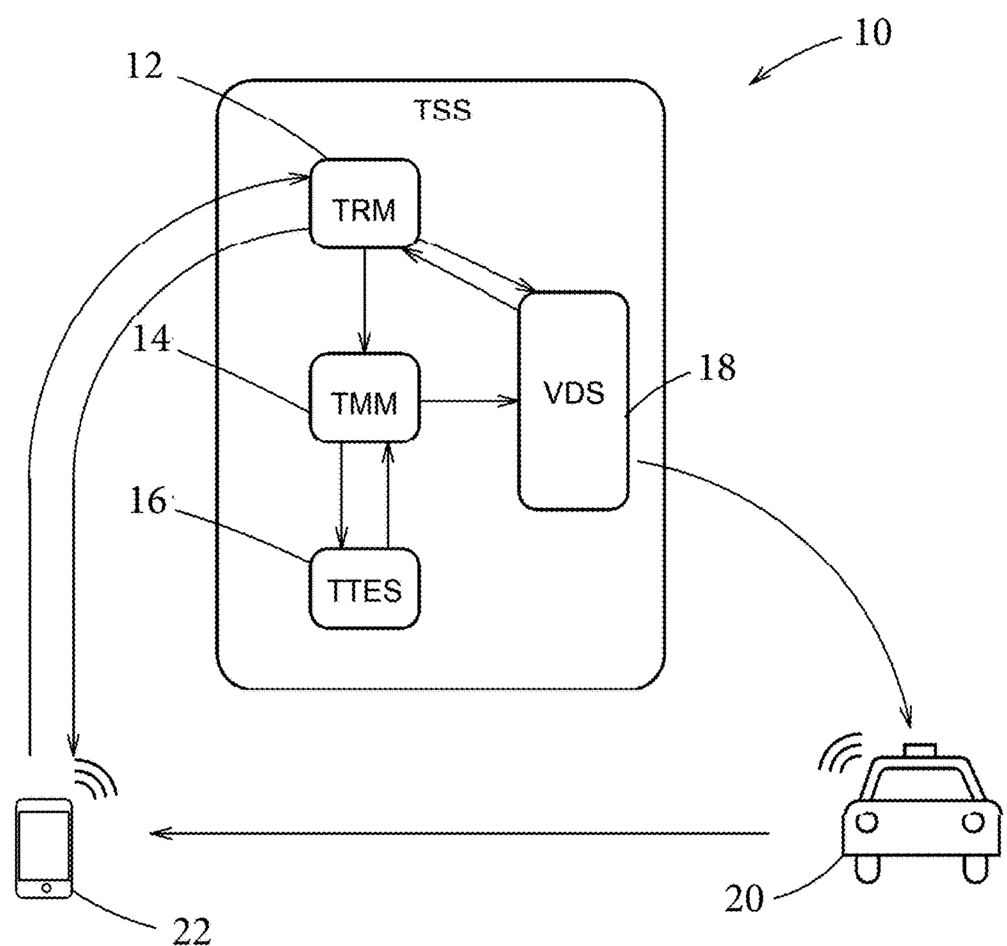
10
12
TSS
TRM
14
TMM
VDS
18
16
TTES
20
22

SYSTEM FOR REAL-TIME OPTIMAL MATCHING OF RIDE SHARING REQUESTS

BACKGROUND OF THE INVENTION

This invention relates to a point-to-point ride sharing system that computes in real time optimal matching of ride sharing requests based on a shareability network.

Analytical and experimental studies based on real-world taxi date sets form different cities in the world (New York, San Francisco, Singapore, and Veinna) have shown a consistent, large potential for taxi ride sharing. In New York, more than 95% of taxi trips can be shared if a maximum delay parameter is set to five minutes, with an operational cost reduction on the order of 30%. Similar results have been obtained in other cities. An operational cost reduction on the order of 30% is very profitable for a taxi company, and allows the definition of a business model in which the benefits of ride sharing are distributed between customers (who pay a lower fare), drivers, and the taxi company itself.

Although several prior art systems have been introduced for real-time collection of trip requests (e.g., taxi e-haling and booking systems), only some of them consider the possibility of sharing rides among patrons. The common practice for ride sharing is that trip requests are elaborated in a sequential fashion: when a new request $R_A$ from patron A arrives, the request is checked for potential sharing with a pool of existing pending requests; depending on parameters such as pickup/dropoff points, patron profile, etc., some of these requests $\{R_1, R_2, \ldots\}$ are considered potentially sharable with $R_A$. The pool $\{R_1, R_2 \ldots\}$ of potentially sharable rides is returned to patron A who then selects the preferred ride sharing option among them, i.e., the ride sharing decision is left to the patron. This method is highly ineffective since a composition of individual patron decisions is not guaranteed to find the system-wide optimal combination of shared trips—and actually in practice it is very likely to build a highly suboptimal solution.

An object of the present invention is a methodology in which trip requests are processed in batches instead of sequentially and trip sharing is decided by a centralized server instead of by a composition of individual customer decisions.

SUMMARY OF THE INVENTION

The system according to the invention for optimal matching of ride sharing requests includes a trip request manager module to receive trip requests from patrons and a trip matching manager module to optimally match trip sharing requests from the trip request manager module. A travel time estimation module and a vehicle dispatching module are also provided. The travel time estimation module calculates:

a. Travel time from $P_A$ to $D_A$ equals $TT_a$ b. Travel time from $P_i$ to $D_i$ equals $TT_b$ c. Travel time from $P_A$ to $P_i$ equals $TT_c$ d. Travel time from $D_i$ to $D_A$ equals $TT_d$ e. Travel time from $P_i$ to $D_A$ equals $TT_c$ f. Travel time from $D_A$ to $D_i$ equals $TT_f$ g. Travel time from $P_i$ to $P_A$ equals $TT_g$ h. Travel time from $P_A$ to $D_i$ equals $TT_h$ wherein $P_A$ is the pickup location for patron A, $D_A$ is the dropoff location for patron A, $P_i$ is the pickup location of patron i and $D_i$ is the dropoff location for patron i; and wherein the trip matching manager module computes whether:

A. $(t_A+TT_c \le t_i+\Delta)$ and $(t_A+TT_c+TT_b+TT_d \le t_A+TT_a+\Delta)$ and $(n_a+n_i \le C)$ B. $(t_A+TT_c+TT_e \le t_A+TT_a+\Delta)$ and $(t_A+TT_c+TT_e+TT_f \le t_i+TT_b+\Delta)$ and $(n_a+n_i \le C)$ C. $(t_i+TT_g \le t_A+\Delta)$ and $(t_i+TT_g+TT_a+TT_f \le t_i+TT_b+\Delta)$ and $(n_a+n_i \le C)$ D. $(t_i+TT_g+TT_h \le t_i+TT_b+\Delta)$ and $(t_i+TT_g+TT_h+TT_d \le t_A+TT_a+\Delta)$ and $(n_a+n_i \le C)$ wherein if any one of the conditions, A, B, C or D is satisfied, trip requests $R_A$ and $R_i$ are sharable, wherein $t_A$ is a desired pickup time for a patron A, $t_i$ is a desired pickup time of a patron i, $n_a$ is the number of passengers requesting trip A, $n_i$ is the number of passengers requesting trip i, $\Delta$ is a delay parameter and C is passenger seating capacity.

In a preferred embodiment, the trip matching manager module runs a maximum matching algorithm to maximize the number of shared trips. In another embodiment, the trip matching manager is adapted to match more than two shred rides. In yet another embodiment, the trip matching manager module utilizes a maximum weighted matching algorithm to find a collection of shared trips that minimize system operational cost, where the weight assigned to a pair of shareable trips for patrons A and i equals the system operation savings of running a shared trip instead of running the two trips for A and i separately.

BRIEF DESCRIPTION OF THE DRAWING

FIG. 1 is a schematic illustration of the ride sharing system according to an embodiment of the invention.

DESCRIPTION OF THE PREFERRED EMBODIMENT

The present invention enables optimal matching of ride sharing requests in real time. Trip requests issued by patrons using their smart phone or similar mobile device are delivered to a central server. As requests arrive, the server builds and maintains a shareability network that is a mathematical model of sharing opportunities between pairs or triplets of trips. At a prescribed time interval T (e.g., one minute), the central server computes the optimal matching of the trips in the current shareability network, and returns the results of the computation to a vehicle dispatching system. The vehicle dispatching system decides the assignment of available vehicles to shared trip requests and notifies the patrons of estimated pickup time and notifies vehicle drivers (or onboard self-driving systems) to pick up the prescribed patrons.

The architecture of an embodiment of the invention is shown in FIG. 1. The system of the invention comprises the following components: a mobile device (smart phone, tablet or similar device) by means of which a patron can interact with a transportation provider; a transportation service system (TSS) operated by a point-to-point transportation provider; and a fleet of vehicles servicing the mobility demand of patrons. These three components communicate with one another by means of wireless communication such as cellular, WiFi or the like. With reference to FIG. 1, the transportation service system (TSS) 10 includes a trip request manager module (TRM) 12 that collects and responds to patron requests. The request from the TRM 12 is delivered to a trip matching manager module (TMM) 14 that optimally matches trip sharing requests according to the shareability network methodology to be described below. The TMM 14 communicates with a travel time estimation system (TTES) 16 that is used to build and maintain the shareability network. A vehicle dispatching system (VDS) 18 dispatches vehicles 20 to service the trip requests.

Still referring to FIG. 1, a patron A accesses the point-to-point transportation application on his or her mobile device 22 and requests a trip by issuing a trip request $R_A$. The trip is specified by including in the request a pickup location $P_A$ (which can be derived from the GPS of the mobile device 22), a dropoff location $D_A$ (e.g., an address), the desired pickup time $t_A$, and the number $n_A$ of passengers requesting the trip. The application offers the patron the possibility of requesting a shared trip which can be done by pressing a suitable button in the app GUI. The patron is informed by the application that he or she will receive a response from the system within a time T, where T is a system parameter chosen by the transportation service provider. Whether the requested trip is shareable is indicated in the trip request through a sharability field $S_A$ set to 1 if the trip is shareable, and set to 0 otherwise. The trip request is transmitted to the TSS 10 by means of wireless communication, e.g., using an available cellular or WiFi connection.

The trip request is received by the TRM 12 and forwarded to the TMM 14 when the shareability field $S_A$ in the request is set to 1. If there is to be no ride sharing, the request is merely forwarded directly to the VDS 18 for vehicle 20 dispatch.

The TMM 14 builds and maintains a data structure called a shareability network. The data structure contains one element for each active request, where the set R equals $\{R_1, R_2, \ldots\}$ of active requests is defined to be the set of requests for which trip matching and vehicle dispatching has not yet been defined. Furthermore, the element corresponding to request $R_i$ in the data structure contains the number of passengers $n_i$ in the request and a reference to the elements of the data structure corresponding to a set of shareable requests $R_j$, $R_k$, . . . , which is defined as the subset of R comprised of all and only the requests in R that can be shared with $R_i$. Sharability between trips is determined according to the following procedure.

When a new request $R_A$ arrives from the TRM 12, a new element corresponding to $R_A$ is built in the shareability network. Furthermore, each request $R_i$ in R is considered. If said R is empty then R is set to $R=\{R_A\}$. If R is not empty, for each considered request $R_i$ the TMM 14 determines whether $R_A$ and $R_i$ can be shared according to the following method. Let $P_A$, $D_A$, $P_i$, $D_i$ be the pickup and dropoff locations of the two trips. Let $t_A$, $t_i$, be the respective desired pickup times and let $n_A$, $n_i$ be the respective number of passengers. The TMM 14 interrogates the TTES 16 requesting computation of the following travel times:

a. From $P_A$ to $D_A$
b. From $P_i$ to $D_i$
c. From $P_A$ to $P_i$
d. From $D_i$ to $D_A$
e. From $P_i$ to $D_A$
f. From $D_A$ to $D_i$
g. From $P_i$ to $P_A$
h. From $P_A$ to $D_i$.

The TTES 16 responds to the TMM 14 sending a list of estimated travel times, called $TT_a$, $TT_b$, . . . , $TT_h$—each referring to the start/ending point of the travel.

The TMM 14 receives the estimated travel times $TT_a$, $TT_b$, . . . , $TT_h$ and performs the following actions, where $\Delta$ is a predefined system parameter called the delay parameter and C is a predefined system parameter called the vehicle passenger seating capacity.

The system checks whether

A. $(t_A+TT_c \leq t_i+\Delta)$ and $(t_A+TT_c+TT_b+TT_d \leq t_A+TT_a+\Delta)$ and $(n_a+n_i \leq C)$
B. $(t_A+TT_c+TT_e \leq t_A+TT_a+\Delta)$ and $(t_A+TT_c+TT_e+TT_f \leq t_i+TT_b+\Delta)$ and $(n_a+n_i \leq C)$
C. $(t_i+TT_g \leq t_A+\Delta)$ and $(t_i+TT_g+TT_a+TT_f \leq t_i+TT_b+\Delta)$ and $(n_a+n_i \leq C)$
D. $(t_i+TT_g+TT_h \leq t_i+TT_b+\Delta)$ and $(t_i+TT_g+TT_h+TT_d \leq t_A+TT_a+\Delta)$ and $(n_a+n_i \leq C)$ If any one of the conditions A, B, C, D is satisfied, trip requests $R_A$ and $R_i$ are considered shareable. In such case, a reference to the element of the shareability network corresponding to trip $R_i$ is included with the element corresponding to trip $R_A$, and vice versa. The data structure also records in the elements corresponding to $R_A$ and $R_i$ which of the conditions A, B, C, D for shareability of requests $R_A$ and $R_i$ were satisfied. This is called route information. No action is undertaken otherwise, i.e., in case the two trips cannot be shared.

Every T seconds, where T is the system parameter discussed above, the TMM 14 runs a maximum matching algorithm on the graph uniquely defined by the reference between nodes m the shareability network. The matching algorithm guarantees maximization of the number of shared trips. As a result of this computation, the set of requests in R is partitioned into a set $R_M$ of matched, requests, and into a set $R_{NM}$ of non-matched requests. Requests in $R_M$ are organized in pairs representing shared trips as defined by the maximum matching algorithm. For each pair ($R_i$, $R_j$) of requests in $R_M$, a shared trip request is prepared and forwarded, to the VDS 18. The shared trip request contains $P_A$, $D_A$, $t_A$, $P_i$, $D_i$, $t_i$, as well as die routing information that has been stored in the shareability network. After the shared trip request is prepared, both the elements corresponding to $R_i$ and $R_j$ in the shareability network are deleted along with, corresponding references to $R_i$, $R_j$ in other elements of the data structure. Non-matched requests $R_{NM}$ are forwarded to the VDS 18 as simple trip requests. The simple trip request corresponding to request $R_h$ reports the following information: $P_h$, $D_h$, $t_h$. After the trip request is prepared, the element corresponding to $R_h$ in the shareability network is deleted, along with the corresponding references to $R_h$ in other elements of the data structure.

The VDS 18 receives trip requests either from the TMM 14 or from the TRM 12. Trip requests can be either simple or shared and are processed sequentially. When processing a request, the VDS 18 determines which vehicle 20 should serve the request according to a vehicle dispatching algorithm. Furthermore, the estimated pickup time at the patron's location is computed. In case of a shared trip request, pickup times at both patrons' locations are estimated based on the route information. The VDS 18 informs the TRM 12 of the estimated patrons' pickup time(s).

The VDS 18 informs the vehicle 20 of the trip request and of the corresponding pickup location via wireless communication. In case of a shared trip request, the vehicle is informed of the pickup locations of both patrons, and which of the two patrons should be picked up first. The TRM 12 then informs the patrons of the estimated pickup time(s). Thereafter, die vehicle picks up the patrons.

The above described system can be extended to consider sharing of up to three trips or even larger number of shared trips. The output, of the TMM 14 may utilize a maximum weighted matching algorithm to find die collection of shared trips that minimizes system operational cost.

As an optional matter, a patron can be presented with three estimated fares for the requested trip: a fare F1 in case he or she opts for the no sharing option, a fare F2 in case he or she opts for the sharing option but the trip could not be shared, and a fare F3 in the case that a trip is shared. The fares are designed in such a way that F3 is less than or equal to F2 less than or equal to F1.

It is thus seen that trip requests in the present system are processed in batches instead of sequentially as known on the prior art. Further, trip sharing is decided by a centralized server instead of by a composition of individual customer decisions. The invention implements a methodology for computing optimal matching of trips—defined according to a clearly specified parameter—in real-time. Experiments we have performed have shown that the approach disclosed herein can find the optimal matching of as many as 10,000 trips in less than 0.01 seconds when a computer program that matches the trips is executed on a standard Linux server.

Those of ordinary skill in the art will recognize that the present invention can be used to implement a ride-sharing taxi system. Other applications include dynamic, on-demand "flexibus" systems in which a fleet of minivans with moderate seating capacity such as nine seats are used to provide point-to-point transportation to individuals or small groups. More broadly, the present invention can be used to implement any transportation system providing point-to-point transportation for individuals or small groups.

It is recognized that modifications and variations of the present invention will be apparent to those of ordinary skill in the art and it is intended that all such modifications and variations be included within the scope of the appended claims.

What is claimed is:

1. A system for optimal matching of ride sharing requests and dispatching of vehicles from a fleet of vehicles to meet the requests in real time comprising:

a trip request manager module to receive trip requests from patrons;

a trip matching manager module to optimally match trip sharing requests from the trip manager request module;

a travel time estimation module; and a vehicle dispatching module;

wherein the travel time estimation module calculates;

a. Travel time from $P_A$ to $D_A$ equals $TT_a$ b. Travel time from $P_i$ to $D_i$ equals $TT_b$ c. Travel time from $P_A$ to $P_i$ equals $TT_c$ d. Travel time from $D_i$ to $D_A$ equals $TT_d$ e. Travel time from $P_i$ to $D_A$ equals $TT_c$ f. Travel time from $D_A$ to $D_i$ equals $TT_f$ g. Travel time from $P_i$ to $P_A$ equals $TT_g$ h. Travel time from $P_A$ to $D_i$ equals $TT_h$ wherein $P_A$ is the pickup location for patron A, $D_A$ is the dropoff location for patron A, $P_i$ is the pickup location of patron i and $D_i$ is the dropoff location for patron i; and wherein the trip matching manager module computes in real time whether;

A. $(t_A+TT_c \leq t_i+\Delta)$ and $(t_A+TT_c+TT_b+TT_d \leq t_A+TT_a+\Delta)$ and $(n_a+n_i \leq C)$ B. $(t_A+TT_c+TT_e \leq t_A+TT_a+\Delta)$ and $(t_A+TT_c+TT_e+TT_f \leq t_i+TT_b+\Delta)$ and $(n_a+n_i \leq C)$ C. $(t_i+TT_g \leq t_A+\Delta)$ and $(t_i+TT_g+TT_a+TT_f \leq t_i+TT_b+\Delta)$ and $(n_a+n_i \leq C)$ D. $(t_i+TT_g+TT_h \leq t_i+TT_b+\Delta)$ and $(t_i+TT_g+TT_h+TT_d \leq t_A+TT_a+\Delta)$ and $(n_a+n_i \leq C)$ wherein if any one of the conditions A, B, C or D is satisfied, trip requests $R_A$ and $R_i$ are sharable, wherein to is a desired pickup time for a patron A, $t_i$ is a desired pickup time of a patron i, $n_a$ is the number of passengers requesting trip A, $n_i$ is the number of passengers requesting trip i, $\Delta$ is a delay parameter and C is passenger seating capacity;

wherein the system is configured to:

generate in real time a data structure defining a shareability network of requested rides, the generating including operations to:

create a node in the data structure for respective active ride requests;

execute an evaluation of conditions A-D to build connections between nodes within the data structure defining the shareability network of requested rides;

store a reference connecting a node associated with a sharable ride request with a respective node determined to be shareable for a plurality of nodes satisfying any one or more of conditions A-D; and store information identifying which of the conditions A-D are satisfied for an evaluated ride determined shareable as part of the data structure; and traverse the data structure to determine a solution for a maximal number of shared trips within the data structure based at least on the connections established within the data structure and the delay parameter;

trigger execution of a ride route including at least a first patron, a first pick up location and at least a second patron and a second pickup location each with respective drop-off locations based on the determination of the solution for the maximal number of shared trips from the data structure.

2. The system of claim 1, wherein the trip matching manager module runs a maximum matching algorithm to maximize the number of shared trips based on the data structure defining the shareability network.

3. The system of claim 1, wherein the trip matching manager is adapted to match more than two shared rides in a given route.

4. The system of claim 1, wherein the trip matching manager module utilizes a maximum weighted matching algorithm to find a collection of shared trips that minimizes system operational cost.

5. The system of claim 1, wherein the trip matching manager module executes a maximum weighted matching algorithm to find a collection of shared trips that minimize system resource utilization.

6. The system of claim 5, wherein ride sharing vehicle utilization is minimized according to a route specified by the maximum weighted matching algorithm.

7. The system of claim 6, wherein the system is configured trigger execution of a ride route including at least a first patron, a first pick up location and at least a second patron and a second pickup location each with respective drop-off locations.

8. A system for matching of ride sharing requests and dispatching vehicles from a fleet of vehicles to meet the requests in real time, comprising:

a trip request manager module to receive trip requests from patrons via mobile computing devices;

a trip matching manager module to match trip sharing requests from the trip manager request module based, at least in part, on determination of a sharable status for a plurality of trip requests;

a travel time estimation module; and a vehicle dispatching module;

wherein the travel time estimation module calculates;

a. Travel time from $P_A$ to $D_A$ equals $TT_a$ b. Travel time from $P_i$ to $D_i$ equals $TT_b$ c. Travel time from $P_A$ to $P_i$ equals $TT_c$ d. Travel time from $D_i$ to $D_A$ equals $TT_d$ e. Travel time from $P_i$ to $D_A$ equals $TT_c$ f. Travel time from $D_A$ to $D_i$ equals $TT_f$ g. Travel time from $P_i$ to $P_A$ equals $TT_g$ h. Travel time from $P_A$ to $D_i$ equals $TT_h$ wherein $P_A$ is the pickup location for patron A, $D_A$ is the dropoff location for patron A, $P_i$ is the pickup location of patron i and $D_i$ is the dropoff location for patron i; and wherein the trip matching manager module is configured to compute in real time:

A. $(t_A+TT_c \le t_i+\Delta)$ and $(t_A+TT_c+TT_b+TT_d \le t_A+TT_a+\Delta)$ and $(n_a+n_i \le C)$;

B. $(t_A+TT_c+TT_e \le t_A+TT_a+\Delta)$ and $(t_A+TT_c+TT_e+TT_f \le t_i+TT_b+\Delta)$ and $(n_a+n_i \le C)$;

C. $(t_i+TT_g \le t_A+\Delta)$ and $(t_i+TT_g+TT_a+TT_f \le t_i+TT_b+\Delta)$ and $(n_a+n_i \le C)$;

D. $(t_i+TT_g+TT_h \le t_i+TT_b+\Delta)$ and $(t_i+TT_g+TT_h+TT_d \le t_A+TT_a+\Delta)$ and $(n_a+n_i \le C)$;

assign a status for trip requests $R_A$ and $R_i$ within a shareability network data structure indicating that evaluated rides are sharable responsive to determining any one of the conditions A, B, C or D is satisfied;

associate information for respective ones of the conditions that are met with the evaluated rides for respective nodes in the data structure;

wherein $t_A$ is a desired pickup time for a patron A, $t_i$ is a desired pickup time of a patron i, $n_a$ is the number of passengers requesting trip A, $n_i$ is the number of passengers requesting trip i, $\Delta$ is a delay parameter and C is passenger seating capacity;

trigger execution of a ride route according to determination of a sharable ride status, the ride route including at least a first patron, a first pick up location and at least a second patron and a second pickup location;

wherein the system is configured to:

generate in real time the data structure defining a shareability network of requested rides, wherein generating in real time the data structure includes operations of:

execute an evaluation of conditions A-D to build connections within the data structure defining the shareability network of requested rides;

store a reference to any sharable ride request with $R_i$, and from the sharable ride to the ride request $R_i$ as part of the data structure; and store information identifying which of the conditions A-D are satisfied for an evaluated ride as part of the data structure; and traverse the data structure to determine a solution for a maximal number of shared trips within the data structure;

trigger execution of a ride route including at least a first patron, a first pick up location and at least a second patron and a second pickup location each with respective drop-off locations based on the determination of the solution for the maximal number of shared trips.

9. The system of claim 8, wherein the system is further configured to execute an evaluation of conditions A-D to build connections within the shareability network of requested rides.

10. The system of claim 8, wherein the data structure defines a set R of active ride requests for which trip matching has not been defined.

11. The system of claim 10, wherein the system is configured to store as a data element $n_i$ associated with a ride request $R_i$, wherein $n_i$ is equal to a number of passengers associated with a respective ride request.

12. The system of claim 11, wherein the system is configured to associate a reference with $R_i$ corresponding to a set of sharable requests defined as a subset of R comprised of all and only the requests in R that can be shared with $R_i$, based on evaluation of conditions A-D.

13. The system of claim 12, wherein the system is configured to:

store a reference to any sharable ride request with $R_i$, and from the sharable ride to the ride request $R_i$; and store information identifying which of the conditions A-D are satisfied for an evaluated ride.

14. The system of claim 8, wherein the delay parameter $\Delta$ is set on an order of minutes of delay.

15. The system of claim 8, wherein the system is further configured to traverse the data structure to determine a solution for a maximal number of shared trips within the data structure.

16. The system of claim 15, wherein the system is further configured to evaluate multiple sharable conditions associated with a plurality of evaluated rides to determine a maximal number of shared trips.

17. The system of claim 8, wherein the system is configured to eliminate sharable rides from the data structure responsive to triggering execution of the ride route.

18. The system of claim 8, wherein the system is configured to:

build a data structure defining sharing opportunities between pairs or triplets of trips at system defined time intervals;

determine matching of the trips in the data structure at system defined time intervals; and communicate results of the determined matching to a vehicle dispatching module.

19. A system for matching of ride sharing requests and dispatching vehicles from a fleet of vehicles to meet the requests in real time, comprising:

a trip request manager module to receive trip requests from patrons via mobile computing devices;

a trip matching manager module to match trip sharing requests from the trip manager request module based, at least in part, on determination of a sharable status for a plurality of trip requests;

a travel time estimation module; and a vehicle dispatching module;

wherein the travel time estimation module calculates;

i. Travel time from $P_A$ to $D_A$ equals $TT_a$ j. Travel time from $P_i$ to $D_i$ equals $TT_b$ k. Travel time from $P_A$ to $P_i$ equals $TT_c$ l. Travel time from $D_i$ to $D_A$ equals $TT_d$ m. Travel time from $P_i$ to $D_A$ equals $TT_c$ n. Travel time from $D_A$ to $D_i$ equals $TT_f$ o. Travel time from $P_i$ to $P_A$ equals $TT_g$ p. Travel time from $P_A$ to $D_i$ equals $TT_h$ wherein $P_A$ is the pickup location for patron A, $D_A$ is the dropoff location for patron A, $P_i$ is the pickup location of patron i and $D_i$ is the dropoff location for patron i; and wherein the trip matching manager module is configured to compute in real time:

A. $(t_A+TT_c \le t_i+\Delta)$ and $(t_A+TT_c+TT_b+TT_d \le t_A+TT_a+\Delta)$ and $(n_a+n_i \le C)$;

E. $(t_A+TT_c+TT_e \le t_A+TT_a+\Delta)$ and $(t_A+TT_c+TT_e+TT_f \le t_i+TT_b\Delta)$ and $(n_a+n_i \le C)$;

F. $(t_i+TT_g \le t_A+\Delta)$ and $(t_i+TT_g+TT_a+TT_f \le t_i+TT_b+\Delta)$ and $(n_a+n_i \le C)$;

G. $(t_i+TT_g+TT_h \leq t_i+TT_b+\Delta)$ and $(t_i+TT_g+TT_h+TT_d \leq t_A+TT_a+\Delta)$ and $(n_a+n_i \leq C)$;

assign a status for trip requests $R_A$ and $R_i$ indicating that evaluated rides are sharable responsive to determining any one of the conditions A, B, C or D is satisfied;

associate information for respective ones of the conditions that are met with the evaluated rides;

wherein to is a desired pickup time for a patron A, $t_i$ is a desired pickup time of a patron i, $n_a$ is the number of passengers requesting trip A, $n_i$ is the number of passengers requesting trip i, Δ is a delay parameter and C is passenger seating capacity;

traverse a shareability network data structure to optimize a maximal number of shared trips based at least on the connections established within the data structure;

trigger execution of a ride route according to determination of a sharable ride status and maximal number of shared trips, the ride route including at least a first patron, a first pick up location and at least a second patron and a second pickup location;

wherein the system is further configured to:

compute the shareability network to include on an order of ten thousand trips, wherein real time is less than 0.01 seconds;

generate in real time the shareability network data structure defining a shareability network of requested rides based on operations executed to:

create a node in the data structure for respective active ride requests;

evaluate conditions A-D to build connections within the data structure defining the shareability network of requested rides;

store a reference connecting a node associated with a sharable ride request with a respective node determined to be shareable; and store information identifying which of the conditions A-D are satisfied for an evaluated ride determined shareable in association with a respective node or connection.

* * * * *

UNITED STATES PATENT AND TRADEMARK OFFICE

CERTIFICATE OF CORRECTION

PATENT NO. : 10,438,137 B2
APPLICATION NO. : 14/507299
DATED : October 8, 2019
INVENTOR(S) : Carlo Filippo Ratti et al.

It is certified that error appears in the above-identified patent and that said Letters Patent is hereby corrected as shown below:

In the Claims

At Column 5, Line 65 Claim 1:
"wherein to is a desired pickup time for a patron A"
Should read:
--wherein $t_A$ is a desired pickup time for a patron A--

At Column 9, Line 8 Claim 19:
"wherein to is a desired pickup time for a patron A"
Should read:
--wherein $t_A$ is a desired pickup time for a patron A--

Signed and Sealed this
Seventh Day of April, 2020

Andrei Iancu
*Director of the United States Patent and Trademark Office*